US008135988B2

(12) United States Patent  
Ramacher et al.

(10) Patent No.: US 8,135,988 B2
(45) Date of Patent: *Mar. 13, 2012

(54) NON-INTRUSIVE GATHERING OF DIAGNOSTIC DATA USING ASYNCHRONOUS MECHANISMS

(75) Inventors: Mark Ramacher, San Carlos, CA (US); Gary Ngai, Saratoga, CA (US); Benoit Dageville, Foster City, CA (US); Karl Dias, Foster City, CA (US); Yair Sarig, San Mateo, CA (US); Marcus Fallen, Belmont, CA (US); Ajith Kumar Mysorenagarajarao, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 217 days.

This patent is subject to a terminal disclaimer.

(21) Appl. No.: 12/251,711

(22) Filed: Oct. 15, 2008

(65) Prior Publication Data

US 2009/0105989 A1    Apr. 23, 2009

Related U.S. Application Data

(60) Provisional application No. 60/981,456, filed on Oct. 19, 2007.

(51) Int. Cl.
*G06F 11/00* (2006.01)
(52) U.S. Cl. .............................. 714/25; 714/37; 714/38.1
(58) Field of Classification Search .................. None
See application file for complete search history.

(56) References Cited

U.S. PATENT DOCUMENTS

| 4,866,635 | A | 9/1989 | Kahn et al. |
|---|---|---|---|
| 5,067,099 | A | 11/1991 | McCown et al. |
| 5,123,017 | A | 6/1992 | Simpkins et al. |
| 5,309,448 | A | 5/1994 | Bouloutas et al. |
| 5,845,272 | A | 12/1998 | Morjaria et al. |
| 5,920,489 | A | 7/1999 | Dibrino et al. |

(Continued)

FOREIGN PATENT DOCUMENTS

EP            633536 A1     11/1995

OTHER PUBLICATIONS

Alexandru, M., et al., "An architectural system solution for technical diagnosis," pp. TuD5-17-TuD5-22, International Society of Information Fusion (ISIF), Copyright 2000. [Can also be found in Information Fusion 2000, Jul. 10-13, 2000, vol. 1.].

(Continued)

*Primary Examiner* — Michael Maskulinski
(74) *Attorney, Agent, or Firm* — Kilpatrick Townsend & Stockton LLP

(57) ABSTRACT

Techniques for non-intrusive performance of diagnostic actions including actions that result in gathering of diagnostic data in response to a condition detected in a monitored system. In one embodiment, the diagnostic actions are performed asynchronously by processes or threads that are different from the failing process or thread that receives or detects the condition that triggers the diagnostic actions such that the failing process or thread can continue processing without being affected by the executions of the diagnostic actions. Multiple asynchronous processes or threads that are different from the failing process or thread may be spawned to perform multiple diagnostic actions in parallel. The asynchronous processes or threads may be monitored to ensure that they do not adversely impact the monitored system.

20 Claims, 6 Drawing Sheets

U.S. PATENT DOCUMENTS

| | | | |
|---|---|---|---|
| 5,922,079 A | 7/1999 | Booth et al. | |
| 5,968,122 A | 10/1999 | Schlosser et al. | |
| 6,012,152 A | 1/2000 | Douik et al. | |
| 6,125,311 A | 9/2000 | Lo | |
| 6,182,249 B1 | 1/2001 | Wookey et al. | |
| 6,208,955 B1 | 3/2001 | Provan et al. | |
| 6,237,114 B1 | 5/2001 | Wookey et al. | |
| 6,243,628 B1 | 6/2001 | Bliley et al. | |
| 6,349,335 B1 | 2/2002 | Jenney | |
| 6,434,512 B1 | 8/2002 | Discenzo | |
| 6,519,552 B1 | 2/2003 | Sampath et al. | |
| 6,535,865 B1 | 3/2003 | Skaaning et al. | |
| 6,539,337 B1 | 3/2003 | Provan et al. | |
| 6,604,141 B1 | 8/2003 | Ventura | |
| 6,615,090 B1 | 9/2003 | Blevins et al. | |
| 6,633,782 B1 | 10/2003 | Schleiss et al. | |
| 6,665,425 B1 | 12/2003 | Sampath et al. | |
| 6,681,215 B2 | 1/2004 | Jammu | |
| 6,697,810 B2 | 2/2004 | Kumar et al. | |
| 6,697,962 B1 | 2/2004 | McCrory et al. | |
| 6,738,811 B1 | 5/2004 | Liang | |
| 6,782,345 B1 | 8/2004 | Siegel et al. | |
| 6,862,698 B1 | 3/2005 | Shyu | |
| 6,892,317 B1 | 5/2005 | Sampath et al. | |
| 6,910,000 B1 | 6/2005 | Yedidia et al. | |
| 6,915,128 B1 | 7/2005 | Oh | |
| 6,944,800 B2 | 9/2005 | Brundridge et al. | |
| 6,983,200 B2 | 1/2006 | Bodin et al. | |
| 6,985,901 B1 | 1/2006 | Sachse et al. | |
| 7,062,749 B2 | 6/2006 | Cyr et al. | |
| 7,096,387 B2 | 8/2006 | Durrant et al. | |
| 7,113,988 B2 | 9/2006 | Chirashnya et al. | |
| 7,124,328 B2 | 10/2006 | Bowers et al. | |
| 7,165,190 B1 | 1/2007 | Srivastava et al. | |
| 7,177,769 B2 | 2/2007 | Larsson et al. | |
| 7,257,744 B2 | 8/2007 | Sabet et al. | |
| 7,281,040 B1* | 10/2007 | Ly | 709/224 |
| 7,281,170 B2 | 10/2007 | Taylor et al. | |
| 7,308,385 B2 | 12/2007 | Wegerich et al. | |
| 7,313,735 B1 | 12/2007 | Levergood et al. | |
| 7,500,143 B2 | 3/2009 | Buia et al. | |
| 7,525,910 B2 | 4/2009 | Wen | |
| 7,546,222 B2 | 6/2009 | Chintalapti et al. | |
| 7,577,872 B2 | 8/2009 | DiBartolomeo et al. | |
| 7,603,674 B2 | 10/2009 | Cyr et al. | |
| 7,668,953 B1 | 2/2010 | Sinclair et al. | |
| 7,802,144 B2 | 9/2010 | Vinberg et al. | |
| 7,937,623 B2 | 5/2011 | Ramacher et al. | |
| 7,941,707 B2 | 5/2011 | Sarig et al. | |
| 7,954,090 B1 | 5/2011 | Qureshi et al. | |
| 8,032,625 B2 | 10/2011 | Benfield et al. | |
| 2003/0033559 A1 | 2/2003 | Williams | |
| 2003/0074607 A1 | 4/2003 | Brundridge et al. | |
| 2004/0078683 A1 | 4/2004 | Buia et al. | |
| 2004/0078695 A1 | 4/2004 | Bowers et al. | |
| 2004/0078727 A1 | 4/2004 | Little et al. | |
| 2004/0153429 A1 | 8/2004 | Horn et al. | |
| 2004/0193956 A1 | 9/2004 | Greenlee et al. | |
| 2005/0102567 A1 | 5/2005 | McGuire et al. | |
| 2005/0120273 A1* | 6/2005 | Hudson et al. | 714/38 |
| 2005/0160325 A1 | 7/2005 | Ogino et al. | |
| 2005/0210331 A1 | 9/2005 | Connelly et al. | |
| 2005/0228880 A1 | 10/2005 | Champlin | |
| 2006/0150156 A1 | 7/2006 | Cyr et al. | |
| 2006/0200711 A1 | 9/2006 | Schondelmayer et al. | |
| 2006/0256727 A1 | 11/2006 | Acharya et al. | |
| 2007/0021966 A1 | 1/2007 | Ellefson et al. | |
| 2007/0283329 A1 | 12/2007 | Caprihan et al. | |
| 2007/0294003 A1 | 12/2007 | Underdal et al. | |
| 2008/0065706 A1 | 3/2008 | Miller et al. | |
| 2008/0109796 A1 | 5/2008 | Kosche | |
| 2008/0125877 A1 | 5/2008 | Miller et al. | |
| 2008/0133978 A1 | 6/2008 | Angamuthu et al. | |
| 2008/0141072 A1 | 6/2008 | Kalgren et al. | |
| 2008/0189488 A1 | 8/2008 | DeWitt et al. | |
| 2008/0208784 A1 | 8/2008 | Hill et al. | |
| 2008/0208787 A1 | 8/2008 | Luchene | |
| 2008/0255885 A1 | 10/2008 | Eisenberger et al. | |
| 2008/0263399 A1 | 10/2008 | Cousin et al. | |
| 2008/0282095 A1 | 11/2008 | Haider et al. | |
| 2008/0297375 A1 | 12/2008 | Khuzadi | |
| 2009/0028055 A1 | 1/2009 | Zaencker et al. | |
| 2009/0083576 A1 | 3/2009 | Vlassova et al. | |
| 2009/0105982 A1 | 4/2009 | Sarig et al. | |
| 2009/0105991 A1 | 4/2009 | Ramacher et al. | |
| 2009/0106180 A1 | 4/2009 | Kuchibhotla et al. | |
| 2009/0106262 A1 | 4/2009 | Fallen et al. | |
| 2009/0106278 A1 | 4/2009 | Ramacher et al. | |
| 2009/0106363 A1 | 4/2009 | Fallen et al. | |
| 2009/0106589 A1 | 4/2009 | Ramacher et al. | |
| 2009/0106595 A1 | 4/2009 | Sarig et al. | |
| 2009/0106596 A1 | 4/2009 | Fallen et al. | |
| 2009/0106601 A1 | 4/2009 | Ngai et al. | |
| 2009/0106605 A1 | 4/2009 | Kuchibhotla et al. | |
| 2009/0327815 A1* | 12/2009 | Sridharan et al. | 714/38 |
| 2010/0100778 A1 | 4/2010 | Sullivan | |
| 2010/0257410 A1 | 10/2010 | Cottrell et al. | |
| 2010/0318847 A1 | 12/2010 | Beg et al. | |
| 2010/0318853 A1 | 12/2010 | Beg et al. | |
| 2010/0318855 A1 | 12/2010 | Beg et al. | |
| 2011/0153540 A1 | 6/2011 | Beg et al. | |

OTHER PUBLICATIONS

U.S. Appl. No. 12/485,759, filed Jun. 16, 2009, Beg et al.
U.S. Appl. No. 12/485,763, filed Jun. 16, 2009, Beg et al.
U.S. Appl. No. 12/485,766, filed Jun. 16, 2009, Beg et al.
U.S. Appl. No. 12/641,038, filed Dec. 17, 2009, Beg et al.
Avin, C., et al., "Identifiability of Path-Specific Effects," UCLA Cognitive Systems Laboratory, Technical Report R-321 of Jun. 2005, in Proceedings of the 19th International Joint Conference on Artificial Intelligence, Edinburgh, Scotland, Aug. 2005, 7 pages.
Haicheng, W., et al., "Research on the Function Model of Distributed Intelligent Monitoring and Diagnosis System Based on Multi-Agent," in Electronic Measurement and Instruments, 2007, The Eighth International Conference on Electronic Measurement and Instruments, ICEMI 2007, pp. 3-393-3-396, Copyright 2007 IEEE. .
Halpern, J. Y., et al., "Causes and Explanations: A Structural-Model Approach—Part I: Causes," Technical Report R-266-UAI of Jun. 2001, in Proceedings of the Seventeenth Conference on Uncertainty in Artificial Intelligence, San Francisco, CA, 2001, pp. 194-202. [Can also be found in British Journal of Philosophy of Science, vol. 56, 2005, pp. 843-887.].
Halpern, J. Y., et al., "Causes and Explanations: A Structural-Model Approach—Part II: Explanations," Technical Report R-266-IJCAI of Jun. 2001, in Proceedings of the Seventeenth International Joint Conference on Artificial Intelligence (IJCAI), San Francisco, CA, 2001, 8 pages. [Can also be found in British Journal of Philosophy of Science, vol. 56, 2005, pp. 889-911.].
Jongsawat, N., et al., "Dynamic Data Feed to Bayesian Network Model and Smile Web Application," in Ninth ACIS International Conference on Software Engineering, Artificial Intelligence, Networking, and Parallel/Distributed Computing, pp. 931-936, Copyright 2008 IEEE.
Morjaria, M., et al., "Monitoring Complex Systems with Causal Networks," IEEE Computational Science & Engineering, vol. 3, Issue 4, Winter 1996, pp. 9-10.
Nielsen, U. H., et al., "Explanation Trees for Causal Bayesian Networks," 8 pages. [Can also be found in Proceedings of the 24th Annual Conference on Uncertainty in Artificial Intelligence (UAI-08), 2008, pp. 427-434.].
Pearl, J., "Causal Diagrams for Empirical Research (With Discussions)," Technical Report R-218-B, Biometrika, vol. 82, No. 4, 1995, pp. 669-710, printed in Great Britain.
Pearl, J., "Causal Inference in Statistics: An Overview," Technical Report R-350 of Sep. 2009, Statistics Surveys, vol. 3, 2009, pp. 96-146.
Pearl, J., "Direct and Indirect Effects," Technical Report R-273-UAI of Jun. 2001, in Proceedings of the Seventeenth Conference on Uncertainty in Artificial Intelligence, San Francisco, CA, 2001, pp. 411-420.
Pearl, J., "Robustness of Causal Claims," Technical Report R-320 of Mar. 2004, Submitted to the 20th Conference on Uncertainty in Artificial Intelligence, Banff, Canada, Jul. 2004, 8 pages. [Can also be found in Proceedings of the 20th Conference on Uncertainty in Artificial Intelligence, AUAI Press, Arlington, VA, Jul. 2004, pp. 446-453.].

Pearl, J., "Simpson's Paradox: An Anatomy," Technical Report R-264, Extracted from Chapter 6 of Causality, Apr. 1999, pp. 1-11.

Pearl, J., "Statistics and Causal Inference: A Review," Test Journal, vol. 12, No. 2, Dec. 2003, pp. 281-345.

Pearl, J., "The Logic of Counterfactuals in Causal Inference (Discussion of 'Causal Inference without Counterfactuals' by A.P. Dawid)," Technical Report R-269 of Apr. 2000, in Journal of American Statistical Association, vol. 95, No. 450, Jun. 2000, pp. 428-435.

Tian, J., et al., "A General Identification Condition for Causal Effects," Technical Report R-290-A of Aug. 2002, in Proceedings of the Eighteenth National Conference on Artificial Intelligence, AAAI Press/The MIT Press: Menlo Park, CA, Aug. 2002, pp. 567-573.

Tian, J., et al., "Probabilities of Causation: Bounds and Identification," Technical Report R-271-A of Feb. 2000, in Annals of Mathematics and Artificial Intelligence, vol. 28, 2000, pp. 287-313.

Uraikul, V., "Artificial Intelligence for Monitoring and Supervisory Control of Process Systems," Science Direct, in Engineering Applications of Artificial Intelligence, vol. 20, Issue 2, Mar. 2007, 17 pages (pp. 115-131 in publication), Copyright 2006 Elsevier Ltd.

Yu, J., et al., "Intelligent Monitoring and Diagnosis of Manufacturing Processes Using an Integrated Approach of KBANN and GA," Science Direct, in Computers in Industry, vol. 59, Issue 5, May 2008, 13 pages (pp. 489-501 in publication), Copyright 2007 Elsevier B.V.

B.V. Zhang, D., et al., "Researches and Application of a Hybrid Fault Diagnosis Expert System," Proceedings of the 3rd World Congress on Intelligent Control and Automation, Jun. 28-Jul. 2, 2000, Hefei, P.R. China, pp. 215-219, Copyright 2000 IEEE.

Non-Final Office Action for U.S. Appl. No. 12/251,671 mailed on Sep. 17, 2010; 13 pages.

Non-Final Office Action for U.S. Appl. No. 12/251,700 mailed on Jul. 19, 2010; 16 pages.

Non-Final Office Action for U.S. Appl. No. 12/252,056 mailed on Sep. 21, 2010; 17 pages.

Non-Final Office Action for U.S. Appl. No. 12/485,766 mailed on Jan. 25, 2011; 21 pages.

Notice of Allowance for U.S. Appl. No. 12/252,056 mailed on Jan. 6, 2011; 6 pages.

Notice of Allowance for U.S. Appl. No. 12/251,671 mailed on Jan. 5, 2011; 6 pages.

Final Office Action for U.S. Appl. No. 12/251,700 mailed on Dec. 29, 2010; 14 pages.

Non-Final Office Action for U.S. Appl. No. 12/252,128 mailed on Dec. 23, 2010; 19 pages.

Non-Final Office Action for U.S. Appl. No. 12/485,759 mailed on Dec. 21, 2010; 21 pages.

Non-Final Office Action for U.S. Appl. No. 12/251,743 mailed on Dec. 14, 2010; 19 pages.

Non-Final Office Action for U.S. Appl. No. 12/251,661 mailed on Nov. 10, 2010; 20 pages.

Non-Final Office Action for U.S. Appl. No. 12/251,731 mailed on Mar. 2, 2011; 36 pages.

Non-Final Office Action for U.S. Appl. No. 12/251,667 mailed on Mar. 1, 2011; 24 pages.

Non-Final Office Action for U.S. Appl. No. 12/251,648 mailed on Mar. 1, 2011; 35 pages.

Office Communication for U.S. Appl. No. 12/251,671 mailed on Feb. 9, 2011; 4 pages.

Notice of Allowance for U.S. Appl. No. 12/251,700 mailed on Sep. 30, 2011, 10 pages.

Final Office Action for U.S. Appl. No. 12/251,731 mailed on Sep. 23, 2011, 23 pages.

Notice of Allowance for U.S. Appl. No. 12/251,667 mailed on Sep. 20, 2011, 9 pages.

Non-Final Office Action for U.S. Appl. No. 12,251,648 mailed on Sep. 20, 2011, 25 pages.

Non-Final Office Action for U.S. Appl. No. 12/252,070 mailed on Aug. 25, 2011, 7 pages.

Final Office Action for U.S. Appl. No. 12/252,128 mailed on Aug. 12, 2011, 10 pages.

Notice of Allowance for U.S. Appl. No. 12/485,766 mailed on Aug. 10, 2011, 1 page.

Final Office Action for U.S. Appl. No. 12/485,759 mailed on Aug. 8, 2011, 12 pages.

Non-Final Office Action for U.S. Appl. No. 12/251,743 mailed on Jul. 19, 2011, 11 pages.

Final Office Action for U.S. Appl. No. 12/251,661 mailed on Jun. 8, 2011, 15 pages.

Non-Final Office Action for U.S. Appl. No. 12/251,685 mailed on May 31, 2011, 9 pages.

Notice of Allowance for U.S. Appl. No. 12/251,700 (Dec. 29, 2011).

Office Action for U.S. Appl. No. 12/251,667 (Jan. 17, 2012).

Notice of Allowance for U.S. Appl. No. 12/251,661 (Nov. 4, 2011).

Office Action for U.S. Appl. No. 12/251,685 (Jan. 9, 2012).

Notice of Allowance for U.S. Appl. No. 12/252,128 (Dec. 12, 2011).

Notice of Allowance for U.S. Appl. No. 12/485,759 (Dec. 19, 2011).

Notice of Allowance for U.S. Appl. No. 12/485,766 (Nov. 9, 2011).

* cited by examiner

NON-INTRUSIVE GATHERING OF DIAGNOSTIC DATA USING ASYNCHRONOUS MECHANISMS

CROSS-REFERENCES TO RELATED APPLICATIONS

This application claims the benefit and priority under 35 U.S.C. 119 (e) of U.S. Provisional Application Ser. No. 60/981,456, filed 19 Oct. 2007, entitled DIAGNOSABILITY FRAMEWORK, the contents of which are herein incorporated by reference in their entirety for all purposes.

This application also incorporates by reference for all purposes the entire contents of the following related and commonly-assigned non-provisional applications, all filed concurrently with the present application:
(1) U.S. application Ser. No. 12/252,056 entitled DIAGNOSABILITY SYSTEM, filed Oct. 15, 2008, now U.S. Publication No. 2009/0106278, published Apr. 23, 2009;
(2) U.S. application Ser. No. 12/251,648 entitled RULE-BASED ENGINE FOR GATHERING DIAGNOSTIC DATA, filed Oct. 15, 2008, now U.S. Publication No. 2009/0105991, published Apr. 23, 2009;
(3) U.S. application Ser. No. 12/251,731 entitled GATHERING CONTEXT INFORMATION USED FOR ACTIVATION OF CONTEXTUAL DUMPING, filed Oct. 15, 2008, now U.S. Publication No. 2009/0106589, published Apr. 23, 2009;
(4) U.S. application Ser. No. 12/251,743 entitled USER-TRIGGERED DIAGNOSTIC DATA GATHERING, filed Oct. 15, 2008, now U.S. Publication No. 2009/0106596, published Apr. 23, 2009;
(5) U.S. application Ser. No. 12/251,661 entitled DIAGNOSTIC DATA REPOSITORY, filed Oct. 15, 2008 now U.S. Publication No. 2009/0106601, published Apr. 23, 2009;
(6) U.S. application Ser. No. 12/251,667 entitled DIAGNOSABILITY SYSTEM: FLOOD CONTROL, filed Oct. 15, 2008 now U.S. Publication No. 2009/0105982, published Apr. 23, 2009;
(7) U.S. application Ser. No. 12/251,671 entitled GATHERING INFORMATION FOR USE IN DIAGNOSTIC DATA DUMPING UPON FAILURE OCCURRENCE, filed Oct. 15, 2008 now U.S. Publication No. 2009/0106595, published Apr. 23, 2009;
(8) U.S. application Ser. No. 12/251,685 entitled SCRUBBING AND EDITING OF DIAGNOSTIC DATA, filed Oct. 15, 2008 now U.S. Publication No. 2009/0106262, published Apr. 23, 2009;
(9) U.S. application Ser. No. 12/251,700 entitled INTELLIGENT COLLECTION OF DIAGNOSTIC DATA FOR COMMUNICATION TO DIAGNOSIS SITE, filed Oct. 15, 2008 now U.S. Publication No. 2009/0106363, published Apr. 23, 2009;
(10) U.S. application Ser. No. 12/252,070 entitled HEALTH METER, filed Oct. 15, 2008 now U.S. Publication No. 2009/0106180, published Apr. 23, 2009;
(11) U.S. application Ser. No. 12/252,128 entitled HEALTH MONITOR, filed Oct. 15, 2008 now U.S. Publication No. 2009/0106605, published Apr. 23, 2009.

BACKGROUND OF THE INVENTION

The present invention relates to system maintenance and diagnosis, and more particularly to techniques for non-intrusive gathering of diagnostic data in a monitored system.

When a monitored system encounters a failure or error, diagnostic data is typically collected and stored to a disk for diagnostic analysis (also referred to as dumping diagnostic data to a disk). The diagnostic data may then be communicated to a diagnosis site for analysis and resolution of the error. The diagnostic data that is collected and stored (also referred to as diagnostic data dumps) can be quite large measuring in thousands of files and several gigabytes of data. As a result, the process of gathering and storing diagnostic data can be time consuming. This can have several negative impacts on the system. For example, when a process or thread encounters an error in the system, the failing process or thread that receives the error may be in a suspended state until the diagnostic data gathering has completed. As a result, an end user sending a request to the failing process or thread may receive no response from the failing process or thread for the request since the failing process or thread is in a suspended state. In addition, if the failing process or thread holds a lock on some system resources that are shared with other processes or sessions, these other processes or sessions may be blocked for the duration of diagnostic data gathering caused by the failing process or thread. Furthermore, due to the size of the diagnostic data being gathered and stored, the task of gathering and storing the diagnostic data can be very resource intensive and may negatively impact the system as a whole. The situation is further aggravated if the failures are encountered by a large number of processes or threads in the system causing the failing processes or threads to collectively exhaust system resources.

BRIEF SUMMARY OF THE INVENTION

Embodiments of the present invention provide techniques for non-intrusive performance of diagnostic actions including actions that result in gathering of diagnostic data in response to a condition detected in a monitored system. In one embodiment, the diagnostic actions are performed asynchronously by processes or threads that are different from the failing process or thread that receives or detects the condition that triggers the diagnostic actions such that the failing process or thread can continue processing without being affected by the executions of the diagnostic actions. Multiple asynchronous processes or threads that are different from the failing process or thread may be spawned to perform multiple diagnostic actions in parallel. The asynchronous processes or threads may be monitored to ensure that they do not adversely impact the monitored system.

According to an embodiment of the present invention, techniques are provided for performing a diagnostic action in a monitored system. An indication of a condition may be received from a first process or thread in the monitored system. A diagnostic action to be performed is determined responsive to the condition, wherein the diagnostic action comprises gathering diagnostic data for the condition. A second process or thread may be initiated. The determined diagnostic action is executed in the second process or thread. The first process or thread may continue processing without being delayed or interrupted by the execution of the diagnostic action in the second process or thread.

In one embodiment, executing the determined diagnostic action in the second process or thread may comprise executing the diagnostic action using context data determined for the condition.

In one embodiment, the second process or thread may be monitored to determine if the second process or thread causes one or more thresholds configured for the monitored system to be reached or exceeded. At least one threshold from the one or more thresholds may be related to one or more resources used by the second process or thread. For example, the at least one threshold is related to an amount of time taken by the second process or thread, an amount of central processing unit (CPU) usage by the second process or thread, an amount of resources used by the second process, or a number of processes or threads executing in the monitored system.

In one embodiment, a prevention action may be performed upon determining that at least one threshold from the one or more thresholds is reached or exceeded due to the second process or thread.

In one embodiment, a third process or thread may be initiated or spawned to perform a diagnostic action, wherein the second and the third process or threads are executed in parallel.

In one embodiment, the second process or thread may be terminated upon determining unsuccessful completion of the diagnostic action performed by the second process or thread. A third process or thread may be initiated or spawned to execute the diagnostic action that was determined to be unsuccessfully completed in the second process or thread.

The foregoing, together with other features and embodiments will become more apparent when referring to the following specification, claims, and accompanying drawings.

DETAILED DESCRIPTION OF THE INVENTION

In the following description, for the purposes of explanation, specific details are set forth in order to provide a thorough understanding of the invention. However, it will be apparent that the invention may be practiced without these specific details.

Embodiments of the present invention provide techniques for non-intrusive performance of diagnostic actions. Diagnostic actions performed in response to a condition detected in a system, including actions that result in the gathering of diagnostic data, are performed asynchronously without interrupting and/or delaying the failing process or thread that receives or detects the condition. In one embodiments, the diagnostic actions are performed asynchronously by processes or threads that are different from the failing process or thread that receives or detects the condition that triggers the diagnostic actions such that the failing process or thread can continue processing without being affected by the executions of the diagnostic actions. Multiple asynchronous processes or threads that are different from the failing process or thread may be spawned to perform multiple diagnostic actions in parallel. These asynchronous processes or threads may be monitored to ensure that they do not adversely impact the monitored system.

Figure 1:
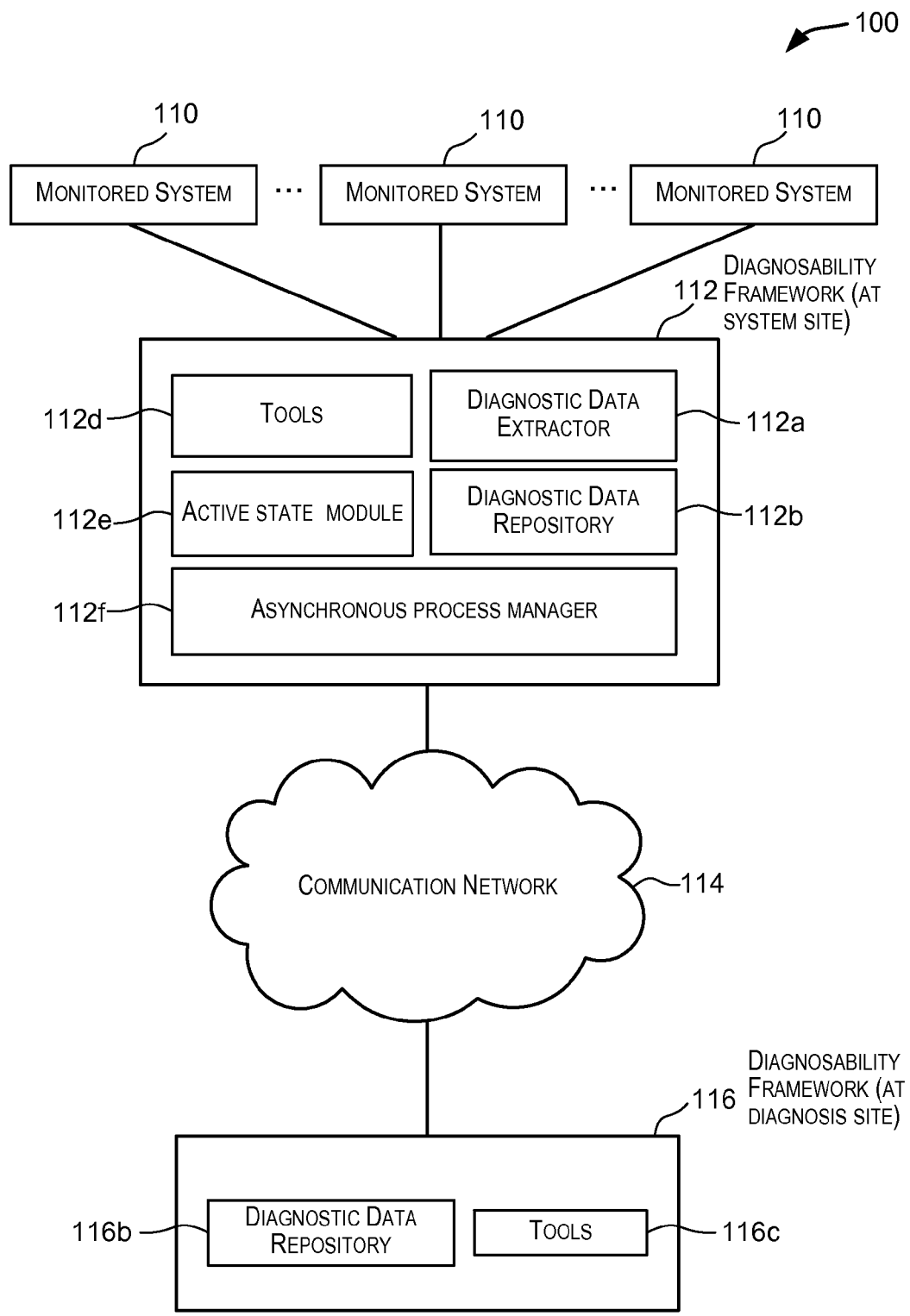
FIG. 1 is a simplified block diagram illustrating a diagnosability system according to an embodiment of the present invention.

FIG. 1 is a simplified block diagram of a diagnosability system 100 according to an embodiment of the present invention. Diagnosability system 100 facilitates collection, storage, communication, and analysis of diagnostic data for or one or more monitored systems 110 (which may be different products or different instances of the same product). Monitored system 110 may be a software system, a hardware system, an enterprise system, and like. For example, monitored system 110 may be a complex enterprise software system such as a database system and related products provided by Oracle Corporation™ of California.

As depicted in FIG. 1, diagnosability system 100 comprises a diagnosability framework 112 deployed at a system site to provide diagnostic support for monitored system 110. Diagnosability system 100 also comprises a diagnosability framework 116 deployed at a diagnosis site. A diagnosis site may be, for example, a site of a vendor that is responsible for diagnosing problems that may occur in monitored system 110.

In a typical diagnostic workflow, diagnostic data is captured and stored for monitored system 110 by diagnosability framework 112. For example, diagnosability framework 112 may be configured to gather and store diagnostic data related to monitored system 110 when a condition is detected in monitored system 110. In one embodiment, the condition detected in monitored system may include an error detected in system 110. The diagnostic data collected and stored by diagnosability framework 112 may include, for example, trace data, diagnostic dumps, run reports, logs (e.g., error logs), results of diagnosability actions, and the like. Portions of the diagnostic data stored by diagnosability framework 112 may be communicated to diagnosability framework 116 located at the diagnosis site for analysis, such as failure analysis to identify and resolve root cause of the failures or errors. The diagnostic data may be communicated from diagnosability framework 112 to diagnosability framework 116 via a communication network 114. Communication network 114 may be any network capable of communicating data such as the Internet, an intranet, a switched network, and the like. Communication network 114 may include wired or wireless communication links. Various communication protocols may be used to communicate data from diagnosability framework 112 to diagnosability framework 116.

As depicted in FIG. 1, diagnosability framework 112 comprises a diagnostic data extractor (DDE) 12a, a diagnostic data repository (DDR) 112b, an active state module 112e, an asynchronous process manager 112f, and various tools 112d. The various components depicted in diagnosability framework 112 are merely examples of components that may be included in diagnosability framework 112. In alternate embodiments, diagnosability framework 112 may have less or more components than those shown. The components in diagnosability framework 112 may be implemented in software (e.g., code, program, instructions that are stored on a machine-readable medium and executed by a processor), hardware, or combinations thereof.

In one embodiment, active state module 112e is configured to gather and store information related to monitored system 110 during run time. Upon occurrence or detection of a condition in monitored system 110, a portion of the information that is gathered and stored by active state module 112e during run time is then available and provided as useful contextual data for the detected condition and facilitates gathering of diagnostic data that is relevant to the detected condition. For example, the information that is gathered and stored by active state module 112e may be provided to DDE 112a for determining one or more diagnostic actions to be performed upon occurrence or detection of the condition in system 110 (e.g., actions for gathering diagnostic data relevant to the condition detected in system). In one embodiment, the information gathered and stored by active state module 112e during run time may be dumped to persistent memory (e.g., disk) upon occurrence or detection of a condition in system 110.

Various different types of information related to monitored system 110 may be gathered and stored by active state module 112e during run time of monitored system 110. In one embodiment, active state module 112e may gather and store information related to one or more local variables that are used in one or more functions in the call stack. For example, active state module 112e may gather and store pointers to the local variables that are used in a function during run time of the monitored system. If the pointers to the local variables are still pointing to something valid (i.e., local variables are still active) upon occurrence or detection of a condition in system 110, then the information related to the local variables (pointers to the variables and other information related to the variables) may be dumped to persistent memory or output to other components of diagnosability framework 112 for use in diagnostic data dumping.

In one embodiment, active state module 112e may gather and store information related to information that is explicitly tagged as relevant to diagnosis. The tagged information may be a specific section of system code or a specific function or process executing in the monitored system. The information related to the tagged information may include a name for the tag, a tag identifier of the tag, a tag state (e.g., "active" or "inactive"), and other information related to the tagged information. In one embodiment, a user such as a developer may explicitly tag a specific section of a function or a specific operation in monitored system 110 as relevant for diagnostics during design time. During run time of system 110, the tag state for a tag may be changed from "inactive" to "active" depending on whether the tagged information is active on the call stack or not. For example, if a specific function is tagged, and if the tagged function is currently active on the call stack, then the tag state associated with the tag is set to "active" and the tag is deemed to be an active tag. On the other hand, if the specific function is not active on the call stack, then the tag state associated with the tag is "inactive" and the tag is deemed to be an inactive tag.

In one embodiment, information related to the tagged information that is tagged by an active tag is provided as useful contextual data for diagnostic data dumping in monitored system 110. In this manner, tagging provides a window into what was occurring in the monitored system at and around the time of the error. Tagging also enables a user to specify what specific contextual data may be gathered by active state module 112e and used for diagnostic data dumping upon failure occurrence.

DDE 112a is configured to detect occurrences of conditions in system 110 and determine one or more diagnostic actions to be performed in response to the detected conditions. In one embodiment, in response to a condition detected in monitored system 110, DDE 112a is configured to determine one or more actions to be performed based upon context data determined for the detected condition. The context data determined for the condition may comprise various pieces of data such as:

Information related to the condition detected in monitored system 110, such as error number and error argument, and the like;

Information related to functions and components of system 110 on the call stack (i.e., a data structure that stores information about processes and functions that are currently being executed by monitored system 110) when the condition is detected in system 110;

Information related to one or more functions and components that signaled the detected condition;

Information related to the probable impacts that the detected conditions may have on monitored system 110;

Information that is gathered and provided by active state module 112e, such as the tagged information, and the like.

In one embodiment, DDE 112a is a rule-based engine that is configured with one or more DDE rules. A DDE rule may identify a DDE condition and one or more diagnostic actions (also referred to as DDE actions) to be performed when the DDE condition specified in the DDE rule is met. A DDE condition specified in a DDE rule may comprise information related to one or more conditions detected in monitored system 110, information related to functions and components that are currently being executed by monitored system 110 when the condition are detected in system 110, information related to tagged functions or processes, and other information. The diagnostic actions specified in a DDE rule may include determining and gathering diagnostic data that is deemed to be relevant to the detected condition in monitored system 110, recommending one or more actions to be performed (possibly for additional diagnostic data gathering or for minimizing the impact of the error), invoking health checks (for gathering monitored system-related information for determining the health of the monitored system), and the like. DDE rules may be user-configurable.

In one embodiment, only diagnostic data that is deemed to be relevant to a condition detected in system 110 is gathered. The context data determined for the condition detected in monitored system 110 coupled with the use of the DDE 112a rules-based engine enables diagnosability framework 112 to intelligently gather diagnostic data that is relevant and useful for resolution of the condition that triggered the diagnostic data gathering. The DDE rules may be configured such that the right level of detail is collected and stored for the condition. Once the DDE rules have been evaluated, the diagnostic data to be gathered for a condition detected in monitored system 110 is automatically determined without requiring any human intervention. DDE 112a and its functions are discussed below in further details.

According to an embodiment of the present invention, diagnostic actions determined by DDE 112a can be classified into two kinds of actions: (1) synchronous actions, and (2) asynchronous actions. In one embodiment, a synchronous diagnostic action is an action that is executed by the failing process or thread. Accordingly, a synchronous diagnostic action is performed by the process or thread that receives the condition that triggered the diagnostic action. For example, a failing process or thread may execute one or more diagnostic actions to collect diagnostic data critical for diagnosis of the condition that caused the process or thread to fail.

An asynchronous action is a diagnostic action that is not performed by the failing process or thread but rather is performed by a different process or thread such that the failing process or thread may continue processing without being affected by the executions of the diagnostic actions. In this manner, the execution of the diagnostic action does not delay the failing process or thread. In one embodiment, the state information related to the failing process or thread is stored to memory (e.g., disk, private memory, shared memory, etc.) and may be used by the asynchronous thread or process to perform the diagnostic action asynchronously. In one embodiment, context data determined for a condition detected in system 110 may be stored in a persistent memory such as a disk and used by an asynchronous process or thread scheduled to perform a diagnostic action responsive to that condition. Thus, by using the context data determined for a condition detected in system 110, even though the diagnostic action is executed in a process or thread different from the failing process or thread, the diagnostic action is executed as if the action was executed by the failing process or thread.

Typically, diagnostic actions that consume a significant amount of time and system resources for executions are executed as asynchronous actions. This minimizes the impact of the diagnostic actions on the system as a whole and also on the specific failing process or thread that receives or detects the condition in system 110. An example of such actions is an action that involves diagnostic dumping of the Redo Logs in a database system. This action typically requires a long time to finish execution and is accordingly executed asynchronously in a process or thread that is different from the failing process, allowing the failing process or thread to continue processing without being interrupted by the execution of the diagnostic action. The ability to run diagnostic actions asynchronously also enables diagnosability framework 112 to gather potentially larger sets of diagnostic data without adversely impacting the performance of monitored system 110. The capture of such large diagnostic data sets may be particularly useful for developers and analysts to diagnose certain types of errors, especially on the first occurrences of the errors.

In one embodiment, an asynchronous process manager 112*f* is configured to facilitate execution of asynchronous actions. In one embodiment, asynchronous process manager 112*f* is a daemon or manager that is configured to receive one or more requests from DDE 112*a* and initiate one or more asynchronous processes or threads that are different from the failing process or thread to perform diagnostic actions asynchronously without delaying the failing process or thread. In this manner, asynchronous process manager 112*f* acts as a common coordinator for receiving requests to perform diagnostic data gathering actions and for initiating asynchronous processes or threads to perform the actions asynchronous. The results from performing a diagnostic action in an asynchronous process or thread may be stored on disk, private memory, shared memory, etc. In one embodiment, the results are stored in diagnostic data repository 112*b*.

In one embodiment, asynchronous process manager 112*f* may receive requests to perform multiple diagnostic actions asynchronously responsive to one or more conditions detected in monitored system 110. In such an embodiment, asynchronous process manager 112*f* may spawn or initiate multiple asynchronous processes or threads for performing the diagnostic actions in parallel, thereby enabling dynamic parallelism. Performing multiple diagnostic actions in parallel may reduce the total time needed for performing diagnostic actions responsive to one or more conditions detected in monitored system 110.

By executing a diagnostic action in an asynchronous process or thread, the failing process or thread is not suspended due to the diagnostic action. The failing process or thread thus remains responsive to user requests or other requests. This enables diagnostic actions that may take a long time or gather a large volume of diagnostic data to be executed without having to worry about the impact of such diagnostic actions on the performance of monitored system 110. The asynchronous processes or threads spawned for executing diagnostic actions thus enable non-intrusive executions of diagnostic actions including non-intrusive gathering of diagnostic data for conditions detected in monitored system 110.

In some environments, it is possible that the number of asynchronous processes or threads for performing diagnostic actions is so large that it impacts the performance of monitored system 110. Accordingly, in one embodiment, the asynchronous processes or threads spawned for performing diagnostic actions asynchronously may be monitored collectively to ensure that monitored system 110 is not adversely impacted by the executions of these diagnostics actions. The monitoring may be performed by asynchronous process manager 112*f*.

Diagnostic data repository (DDR) 112*b* (also sometimes referred to as ADR in the applications incorporated by reference in the present application) provides a centralized repository for storing diagnostic data related to monitored system 110 collected by diagnosability framework 112. The diagnostic data collected by diagnosability framework 112 may be stored in a structured format that enables searching and database-like querying capabilities. In one embodiment, DDR 112*b* is a file-based repository. Various different types of diagnostic data may be stored in DDR 112*b* such as traces, dumps, alert logs, health monitor reports, and the like. Information gathered by active state module 112*e* (e.g., such as information related to one or more local variables for a particular function on the call stack) may be stored or dumped into DDR 112*b*.

In one embodiment, DDR 112*b* is capable of storing diagnostic data for multiple monitored systems such as multiple monitored systems 110. The diagnostic data collected for each monitored system 110 may be stored under a separate directory (e.g., an ADR_HOME directory) allocated to that system. The ADR_HOME directories share a common structure to facilitate analysis of the stored data across multiple monitored systems 110. Multiple ADR_HOME directories may be present under a single ADR_BASE directory. In this manner, diagnostic data for multiple monitored systems 110 may be stored and organized in a consistent manner.

In one embodiment, the diagnostic data stored in DDR 112*b* may be tagged or annotated with metadata information. The metadata information may be used to find correlations between pieces of the diagnostic data stored in DDR 112*b*. The metadata also enables navigation of the diagnostic data stored in DDR 112*b*. The metadata may include one or more correlation keys. Further information related to DDR 112*b* and correlation keys may be found in the applications incorporated by reference in the present application.

Various tools 112*d* may be provided as part of diagnosability framework 112. These tools may include tools for querying the diagnostic data or information stored in diagnostic data repository 112*b*, tools for generating reports, analysis tools, and other tools that may use information collected and stored by diagnosability framework 112. Further information regarding tools 112*d* can be found in the applications incorporated by reference in the present application.

As mentioned previously, the diagnostics data collected by diagnosability framework 112 may also be forwarded to diagnosability framework 116 located at a remote site (for example, the site of a software system vendor) for analysis. As depicted in FIG. 1, diagnosability framework 116 may comprise a diagnostic data repository 116*b*, and one or more tools 116*c*. The various components depicted in the diagnosability framework 116 are merely examples of components that may be included in the diagnosability framework. In alternate embodiments, diagnosability framework 116 may have less or more components than those shown in FIG. 1. The components depicted in diagnosability framework 16 may be implemented in software, hardware, or combinations thereof.

In one embodiment, diagnostic data repository 116*b* provides a repository for storing diagnostic data received from one or more system sites. In one embodiment, the structure of diagnostic data repository 116*b* is the same as the structure of diagnostic data repository 112*b* at system sites. This facilitates efficient storage and analysis of the data. In such an embodiment, data received from system site packages is stored in the same directory location in diagnostic data repository 116*b* as the data that was stored in diagnostic data repository 112*b*.

Various tools 116*c* may be provided in diagnosability framework 116 to help analyze the diagnostic data received from diagnosability framework 112 and to guide management and resolution of problems and errors in monitored systems. These tools may include command line or GUI-based tools for use by personnel at the diagnosis site. For example, the tools may include a tool that may be used to analyze the diagnostic data received from the software system site and to identify causes for the errors, tools for automatically routing the diagnostic data to a correct entity (e.g., a particular group or department responsible for the software that experienced the error, one or more software developers responsible for solving the error, a system administrator, etc.) for diagnosis, and the like.

The present application focuses on asynchronous process manager 112*f* of diagnosability framework 112. Information related to the various other components of diagnosability system 100 may be found in the applications incorporated by reference in the present application.

Figure 2:
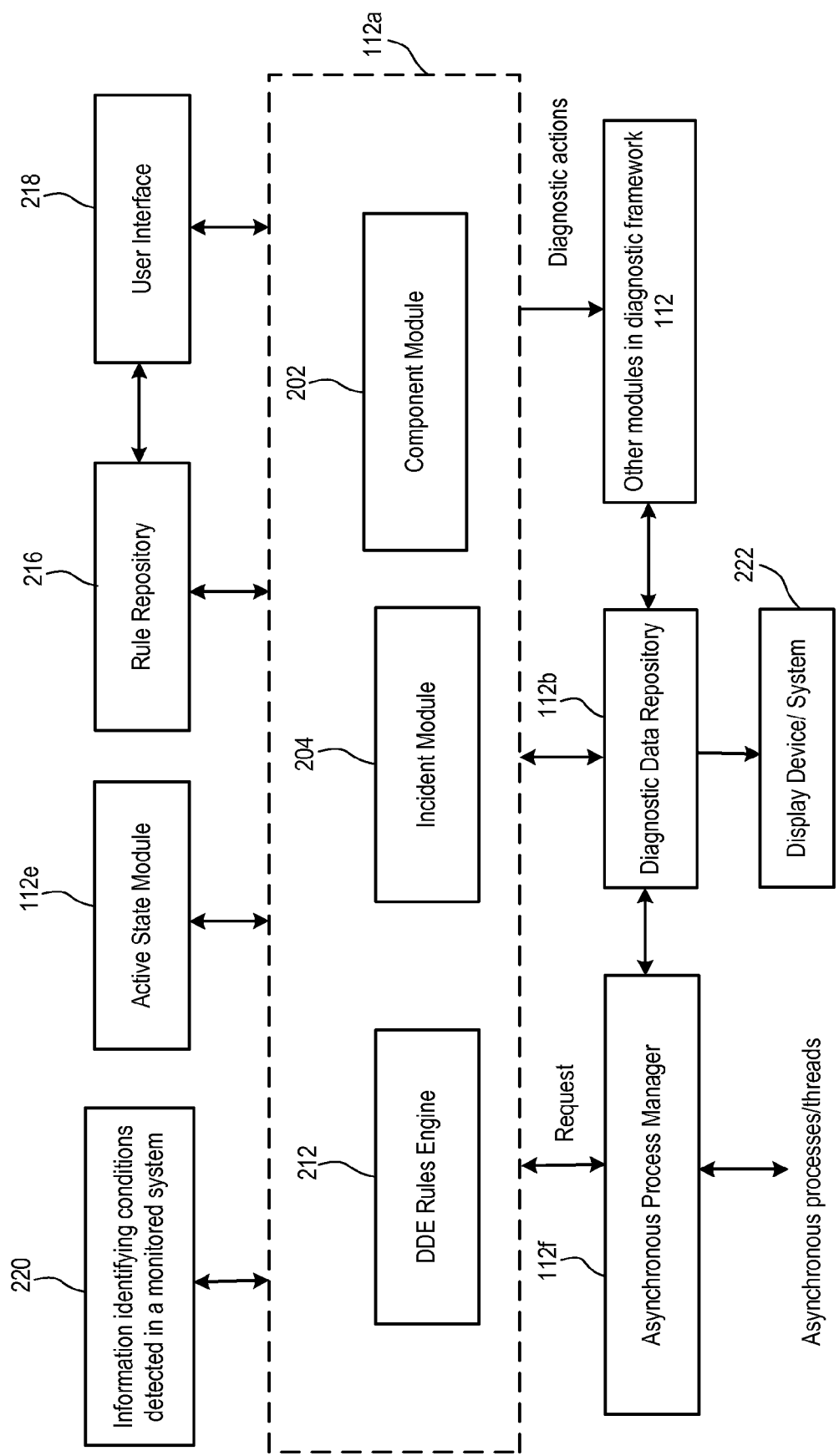
FIG. 2 is a simplified block diagram depicting a diagnostic data extractor (DDE) module and an asynchronous process manager according to an embodiment of the present invention.

FIG. 2 is a simplified block diagram depicting a diagnostic data extractor (DDE) module and an asynchronous process manager according to an embodiment of the present invention. The various components depicted in FIG. 2 are merely examples of components that may be included in such an embodiment. In alternate embodiments, there may have less or more components than those shown in FIG. 2. The components depicted in FIG. 2 may be implemented in software (e.g., code, program, instructions that are stored in a machine-readable medium and executed by a processor), hardware, or combinations thereof.

In one embodiment, DDE 112*a* may be configured to detect one or more conditions occurring in monitored system 110. The conditions may also be detected by other components of diagnosability framework 112. The conditions detected in monitored system 110 may include errors or failures in monitored system 110. In one embodiment, an error condition may be classified as a critical error or a non-critical error. An error may be considered a critical error if the error is caused due to the working of monitored system 110 itself as opposed to an error caused by a client or user's improper use of system 110. For example, a critical error may be an internal error, a system access violation, or some external error (e.g., an object being accessed no longer exists).

Information 220 identifying the one or more detected conditions in system 110 may be provided to DDE 112*a* for determining one or more diagnostic actions to be performed responsive to the conditions. Information 220 may comprise various pieces of information that identify the detected conditions. In one embodiment, an error condition detected in system 110 may be characterized by an error number and error arguments that are associated with the error. For example, in an Oracle database monitored system, error number ORA-60x identifies internal errors that occur in the monitored database system, error number ORA-4020 identifies an external error that occurs in the database system such as a deadlock detected while trying to lock a library object, and so on.

A single error number may be associated with multiple error conditions. Errors that are associated with the same error number may belong to the same class of errors. Since multiple error conditions may be classified under the same error number, one or more error arguments may be used to further identify the error conditions. For example, an error argument associated with an error condition identified by an error number may indicate a specific code location that threw an exception that caused the error condition. In this manner, error arguments provide additional information about an error condition detected in monitored system 110.

For a condition detected in monitored system 110, various context data may be determined for the detected condition. The context data determined for a condition in system 110 may reflect the state of monitored system 110 at the time the condition occurred or detected. The context data may comprise data that provides information related to the detected condition. For example, the context data determined for a condition detected in system 110 may comprise various pieces of data including an error number and one or more error arguments associated with the condition. In one embodiment, the context data determined for a condition in system 110 may be stored in diagnostic data repository 112*b* and provided to or made accessible by other components of diagnosability framework 112. For example, DDE 112*a* may use the context data determined for a condition and stored in data repository 112*b* to determine one or more diagnostic actions to be performed responsive to the condition.

The context data determined for the detected condition in monitored system 110 may include an impact level associated with that condition. In one embodiment, the following impact levels may be defined and associated with the detected condition:

Level 0—This level is associated with conditions related to the error handling code (i.e., the code that handles the occurrence of the conditions such as changing the normal flow of execution upon occurrence or detection of the condition) and DDE module 112*a*;

Level 1—This level is associated with all internal errors and OS exceptions detected in the monitored system;

Level 2—This level is associated with external errors that are handled by DDE module 112*a*.

Level 3—This level is associated with external errors that are not handled by DDE module 112*a*. The rule-based processing performed by DDE 112*a* may not be invoked for these errors.

The context data determined for a condition detected in monitored system 110 may include impact information associated with the condition specifying the potential impact(s) that the condition may have on monitored system 110. In one embodiment, the impact information associated with the condition detected in monitored system 110 describes the potential consequences of the condition in terminology that is understandable by users such as system administrators who can use the information to take remedial actions to repair or mitigate the impacts.

For example, the impact information for a memory corruption error related to the dictionary heap may indicate that the dictionary is corrupted. As another example, the impact information related to a memory corruption error related to a heap that belongs to row cache may indicate that the row cache has been corrupted. Accordingly, the same condition (i.e., memory corruption) detected in system 110 may have different associated impacts depending upon the context of the condition. The impact information thus provides specific contextual information related to the impact of a condition on monitored system 110, such as which particular memory was corrupted rather than some generic impact information such as "memory corruption".

In one embodiment, the impact information may be specified in an external file that maps the impact information to an error number and/or error arguments that are associated with the system condition. In this embodiment, given an error number and/or error arguments that are associated with the system condition, DDE 112a may then use the external file to map the error number and/or error arguments to the associated impact information.

In one embodiment, the user of diagnosability framework 112 may also customize the information that is gathered as contextual data. In one embodiment, this is done by enabling a user, such as a developer, to tag specific sections of the software or a particular function or process in monitored system 110 as relevant for diagnosis. In one embodiment, active state module 112e is configured to identify the tagged information and gather information related to the tagged information. In one embodiment, information related to the tagged information that is tagged by an active tag is provided as useful contextual data for facilitating diagnostic data dumping in monitored system 110. For example, a "Parsing SQL" operation may be tagged by an active tag indicating that an operation related to parsing SQL is presently active on the call stack of monitored system 110. In this manner, the user is able to specify what specific context data may be gathered and used for facilitating diagnostic data gathering in monitored system 110.

The context data determined for a condition detected in monitored system 110 may further include information related to components of monitor system 110. Components of monitored system 110 may include various components of monitored system including data component, cache component, dictionary component, memory component, and the like. The component information may include information related to components of monitored system 110 that are active on the call stack when the condition was detected or occurred, information related to the component of monitored system 110 that signaled the system condition, information related to the system component that has been identified as most likely having caused the system condition, and the like.

In one embodiment, the component information may be determined by a component module 202. For example, component module 202 may determine one or more different function names on the call stack when the condition occurred or was detected. Component module 202 may then map the function names to the component information that is associated with the function names on the call stack when the condition occurred or was detected. In one embodiment, in order to prevent issues arising from function name mangling among different monitored system platforms, component module 202 may be configured to first normalize the various different function names on the call stack and then use the normalized names for mapping purposes.

The context data determined for a condition in monitored system 110 may further include information associated with an incident that is generated for an error detected in system 110. In one embodiment, an incident represents a single occurrence of an error in monitored system 110. In one embodiment, an incident is created only for a critical error detected in monitored system 110. In the embodiment depicted in FIG. 2, DDE 112a comprises an incident module 204 that is configured to create incidents for errors detected in monitored system 110.

Various information may be associated with and stored for each incident that is created by incident module 204. A problem key may be generated for and associated with an incident. The problem key for an incident may comprise an error number, one or more error arguments, and other information that is associated with the error that caused the creation of the incident. Thus, a problem key associated with an incident provides an indication of the characteristics of the incident including symptoms of the incident. In one embodiment, problem keys are used to map incidents to one or more problems.

A problem is a way of grouping one or more incidents that are perceived to have the same symptoms and problem keys. In one embodiment, incidents that have the same associated problem key are mapped to a single problem representing a specific symptom. Such a mapping may be used to reduce the amount of diagnostic data (e.g., avoid redundant diagnostic data) that is collected for multiple incidents that have the same symptom. For example, instead of collecting and storing diagnostic data for each incident that maps to a problem, only a limited amount of diagnostic data may be collected and stored for the problem that corresponds to multiple incidents.

In one embodiment, DDE 112a may include a DDE rules engine 212 for determining one or more diagnostic actions to be performed in response to a condition detected in monitored system 110. One or more DDE rules may be configured for and provided to DDE rules engine 214. As mentioned previously, a DDE rule may specify a DDE condition and one or more diagnostic actions to be performed when the DDE condition is met. In one embodiment, a DDE condition specified in a DDE rule may comprise one or more expressions connected by one or more logic operators. An expression in a DDE condition may be associated with one or more arguments. For example, the following expressions and operators may be defined for a DDE condition:

1. Expressions related to an error: Error_Number(<error_number>), Error_Arg1(<1$^{st}$ argument>), Is_Internal_Error(<error_number>), Is_External_Error (<error_number>).
2. Expressions related to system components or function names: Active_Component(<component>), Signaling_Component(<component >), Function_Name (<function name >).
3. Expressions related to impacts that a condition detected in a system may have on the monitored system: Impact (<impact_name>). For example, a condition may be defined as Impact(Disk-Corruption).
4. Expressions related to a diagnostic tag that tags a specific operation as relevant for diagnostic purposes: Active_Tag(<tag_name>). For example, Active_Tag (transaction_rollback).
5. Logical operators may be used to connect multiple expressions. The logical operators may include "AND", "OR", "NOT", parentheses, and the like. For example, the following expression may be connected by the logic operator "AND": Error_Number(<error_number>) AND Impact(Disk-Corruption)

In one embodiment, DDE rules engine 212 is configured to evaluate the set of DDE rules for a detected condition in system 110 based upon the context data determined for the detected condition. In one embodiment, DDE rules engine 212 compares the context data determined for a system condition detected in system 110 to the DDE condition specified in a DDE rule to determine if the DDE condition is satisfied. For example, for an identified DDE rule as shown below:

If Error_Number (<600>) then perform ACTION_1
DDE 112a determines if the DDE condition Error_Number (<600>) is satisfied based on the context data determined for the detected condition in system 110. If it is determined that the detected error in system 110 has an associated error number 600, then the DDE condition Error_Number (<600>) is evaluated to be true and thus satisfied and the corresponding diagnostic action ACTION_1 specified in the DDE rule is then initiated (either synchronously or asynchronously).

In another example, for a DDE rule specified below
"Error_Number (<600>) AND ActiveComponent (Heap Manager)→HEAPDUMP level=1 and heaptype=UGAHEAP"
DDE 112a determines a heap dump action related to the UGA heap to be performed if the associated DDE condition "Error_Number (<600>) AND ActiveComponent (Heap Manager)" is evaluated to be true based on the context data determined for a system condition detected in system 110. In one embodiment, DDE rules are evaluated based on information other than the context data determined for the condition detected in system 110.

The actions that are determined by DDE rules engine 212 to be performed may include performing tasks that gather diagnostic data that is relevant to the condition detected in system 110 that triggered the DDE rules evaluation, store the gathered diagnostic data in a repository, recommend one or more diagnostic actions to be performed subject to user confirmation, and other diagnostic actions. In this way, by evaluating DDE rules for a condition detected in monitored system 110, DDE 112a automates the gathering of diagnostic data that is relevant to the specific condition detected in monitored system 110. Since diagnostic data relevant to the particular condition is captured, it facilitates resolution of the condition since the likelihood that diagnostic data relevant to and needed for the resolution of the condition is captured is increased. Such a contextual dumping effectively reduces time-to-resolution of conditions detected in monitored system 110. Conditions including errors may be resolved on the first occurrences of these conditions.

A diagnostic action determined by DDE rules engine 212 after matching a DDE rule may be performed synchronously by the failing process or thread that receives or detects the condition that triggered the diagnostic action or asynchronously by a process or thread different from failing process or thread such that the failing process or thread can continue processing without being interrupted or delayed by the execution of the diagnostic action. In one embodiment, upon determining that a DDE rule has been satisfied, DDE rules engine 212 may send a signal to some other components of diagnosability framework 112 to perform one or more DDE actions specified in the DDE rule. For example, if the DDE action called for in the DDE rule is a health check (a health check is a piece of code that is executed by a processor and the execution of which results in information related to system 110 being determined and/or gathered for diagnostic purposes), a signal may be communicated to a health monitor module (not shown in FIG. 2) to perform the health check.

If the diagnostic action determined by DDE 112a is to be performed as an asynchronous action (diagnostic actions that consume a significant amount of time and system resources for executions are usually executed as asynchronous actions), DDE rules engine 212 or other components of DDE 112a may send a request to asynchronous process manager 112f for initiating one or more asynchronous processes or threads for performing the diagnostic action based upon the information received in the request. A request received from DDE 112a may include information related to the diagnostic action to be performed such as an action name, an action identifier (action ID), one or more arguments to the action, and other information associated with the diagnostic action.

As indicated above, asynchronous process manager 112f may receive multiple requests from DDE 112a for initiating multiple asynchronous processes or threads to perform multiple diagnostic actions in parallel. Accordingly, multiple diagnostic actions responsive to one or more conditions received by one or more failing processes or threads may be performed in parallel.

The asynchronous processes or threads spawned for performing diagnostic actions asynchronously may be monitored collectively to ensure that monitored system 110 is not adversely impacted by the executions of these diagnostics actions. The monitoring may be performed by asynchronous process manager 112f. Various thresholds may be set to facilitate the monitoring and take preventive actions. For example, in one embodiment, the number of asynchronous processes or threads that are initiated is monitored and controlled such that the number of asynchronous processes or threads executing in parallel in system 110 is limited to some user-configurable threshold.

The resources used by the asynchronous processes or threads may also be monitored and preventive actions taken if some related user-configurable thresholds are exceeded. For example, the time taken by the asynchronous processes or threads, the CPU usage of the asynchronous processes or threads, memory resources used by the asynchronous processes or threads may also be monitored to ensure that these processes or threads do not adversely impact monitored system 110. One or more preventive actions may be taken if thresholds related to the monitored resources are reached or exceeded. In this manner, the diagnostics actions may be constrained thereby enabling proper resource management and non-intrusive gathering of diagnostic data in monitored system 110. These thresholds may be user configurable.

One or more preventive actions may be taken upon determining that a particular threshold has been reached or executed. The preventive actions may include terminating one or more of the asynchronous processes or threads. A new process or thread may be initiated for performing the diagnostic action at a later time.

In one embodiment, the status of an asynchronous process or thread is tracked to determine if the process or thread completes successfully. For example, the asynchronous process or thread that executes a diagnostic action may return a status upon the end of the execution of the diagnostic action to indicate if the execution of the diagnostic action was successfully completed, incomplete, or failed, etc. Asynchronous execution manager 112f may then report this status to the failing process. If the asynchronous process or thread did not complete successfully then the process or thread may be terminated and another asynchronous process or thread may be initiated to execute the diagnostic action. The diagnostic action may be re-executed from the start or may be re-executed from where the previous execution of the action stopped. State information stored during the previous execution of the action may be used to restart the execution.

In one embodiment, context data determined for a condition may be used by an asynchronous process or thread scheduled to perform a diagnostic action responsive to the condition. The context data determined for the condition may be stored in a persistent memory such as diagnostic data repository 112b and/or included as arguments in a request received by asynchronous process manager 112f. Asynchronous process manager 112f may then pass the context data to the asynchronous process or thread that is initiated for performing the action. In this manner, by using the context data determined for a condition detected in system 110, even though the diagnostic action is executed by an asynchronous process or thread that is different from the failing process or thread, the diagnostic action is executed as if the action was executed by the failing process or thread.

In this manner, by initiating an asynchronous process or thread from the failing process or thread to perform a diagnostic action and by monitoring and controlling the asynchronous process or thread that executes the diagnostic action, the negative impacts of performing a diagnostic action on monitored system 110 as a whole and on the failing process or thread is minimized. This enables the software system to gather potentially larger sets of diagnostic data for developers to develop a better understanding of the problem encountered, which in turn may reduce the time-to-resolution for errors or failures detected in monitored system 110.

The results from executing a diagnostic action either synchronous or asynchronous may be output and/or stored. For example, the results may be output to a user of diagnosability framework 112 or may be stored in diagnostic data repository 112b. The results from executing a diagnostic action may include information related to monitored system 110 that is determined and/or gathered for diagnostic purposes, such as relevant diagnostic data gathered for a specific condition detected in monitored system 110, information obtained from running a health check, information collected from executing a user action, and the like. In one embodiment, the results from executing a DDE action are organized and stored in diagnostic data repository 112b. Diagnostic data repository 112b provides a centralized location for storing various different types of diagnostic data, such as traces, dumps, alert logs, health monitor reports, and the like, in a structured format. The information and diagnostic data stored in diagnostic data repository 112b may be displayed through a display device or system, such as device 222.

Figure 3:
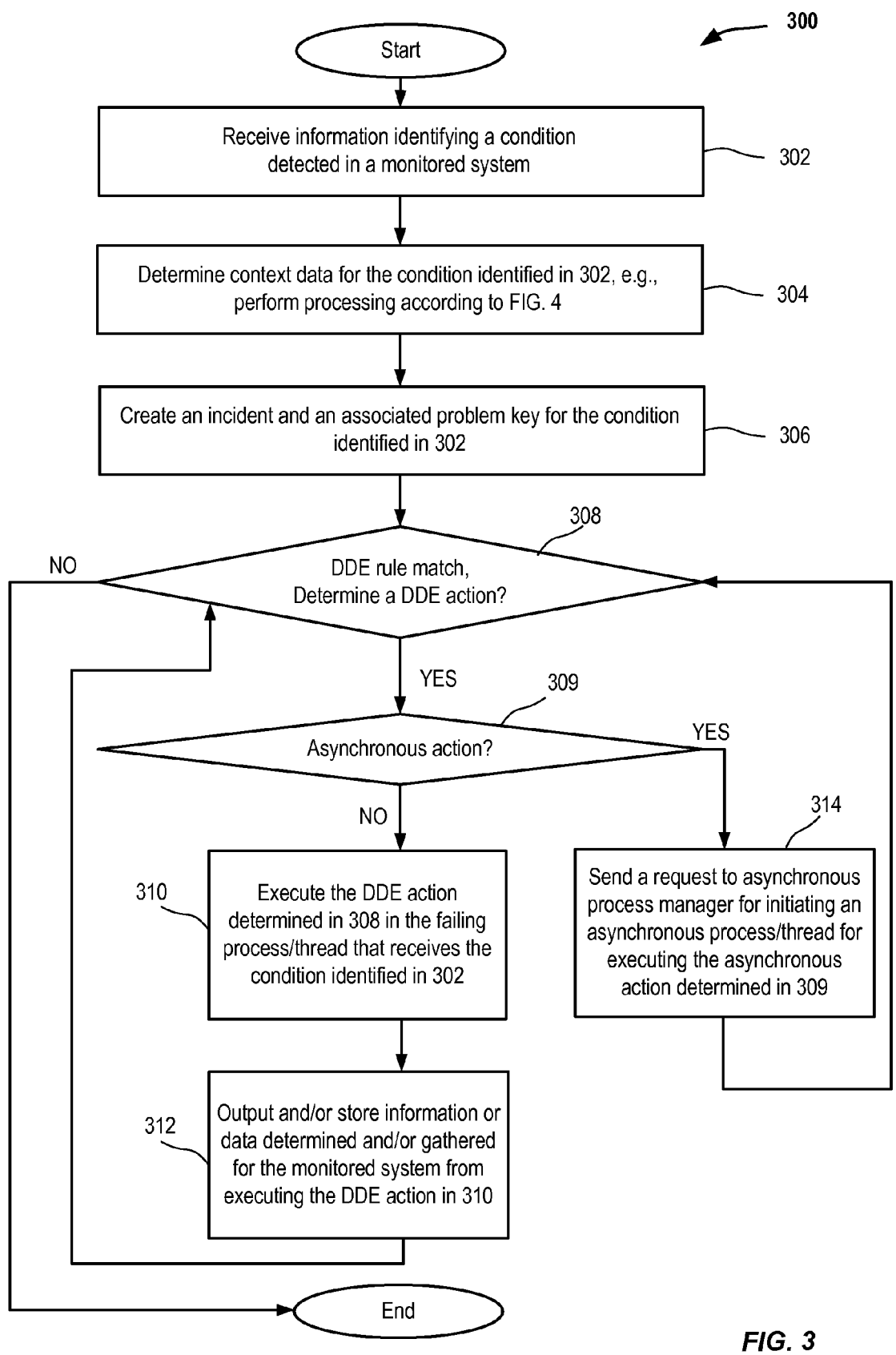
FIG. 3 is a simplified flow chart depicting a method for determining a diagnostic action according to an embodiment of the present invention.

FIG. 3 is a simplified flow chart depicting a method for determining a diagnostic action according to an embodiment of the present invention. The processing depicted in FIG. 3 may be performed by software (executed by a processor), hardware, or combinations thereof.

Referring to FIG. 3, at 302, processing is initiated upon receiving information indicative of a condition detected in monitored system 110. The information received in 302 may include information identifying the detected condition and related information. In one embodiment, the information in 302 may be received by DDE 112a.

At 304, context data is determined for the condition identified in 302. As described above, the context data that is determined for the condition may include information related to the condition such as error number and error arguments associated with the condition, information related to components of the monitored system on the call stack when the condition identified in 302 occurred or was detected, information that is captured by active state module 112e such as information related to tagged function or process, information related to an incident that is created as a result of the detected condition, and the like. The context data determined in 304 may be provided to or accessed by DDE 112a.

At 306, DDE 112a may create an incident and an associated problem key for the condition identified in 302.

At 308, one or more DDE rules are evaluated to determine one or more diagnostic actions to be performed responsive to the condition identified in 302. The processing in 308 involves determining if one or more of the DDE rules are matched by the condition identified in 302. As part of this processing, a determination is made if the DDE conditions associated with the DDE rules are satisfied by the condition identified in 302. The context data determined in 304 and other condition-related data received in 302 may be used to determine if the DDE conditions are satisfied. For a DDE rule, if the DDE condition specified by the DDE rule is matched by the condition identified in 302, then the DDE rule is considered as a matched rule and the one or more DDE actions associated with the matched DDE rule are determined to be performed responsive to the condition identified in 302.

At 309, for each diagnostic action determined to be performed in 308, a determination is made whether the determined action is to be executed synchronously or asynchronously. In one embodiment, a developer or some other user may configure or specify whether a diagnostic action is to be executed synchronously or in an asynchronous manner. In one embodiment, a flag may be associated with a diagnostic action indicating whether the action is to be executed synchronously or asynchronously.

If it is determined in 309 that the DDE action determined in 308 is to be executed in an asynchronous process or thread, then at 314 a request for initiating an asynchronous thread or process for performing the DDE action determined in 308 in an asynchronous manner may be sent. In one embodiment, the request may be sent to asynchronous process manager 112f. Processing for initiating an asynchronous thread or process and for performing the diagnostic action asynchronously is depicted described below. Otherwise, if it is determined in 309 that the DDE action determined in 308 is to be performed in a synchronous manner, then the DDE action is performed by the failing process or thread in 310.

At 312, the results from executing the DDE action in 310 may be output and/or stored. The results from executing the DDE action in 310 may include information related to monitored system 110 that is determined and/or gathered for diagnostic purposes, such as relevant diagnostic data gathered for the condition identified in 302. In one embodiment, the results from executing a DDE action may be displayed to a user via a display device (optional) such as via a user interface displayed on a monitor. The results from executing a DDE action may be stored in diagnostic data repository 112b.

Figure 4:
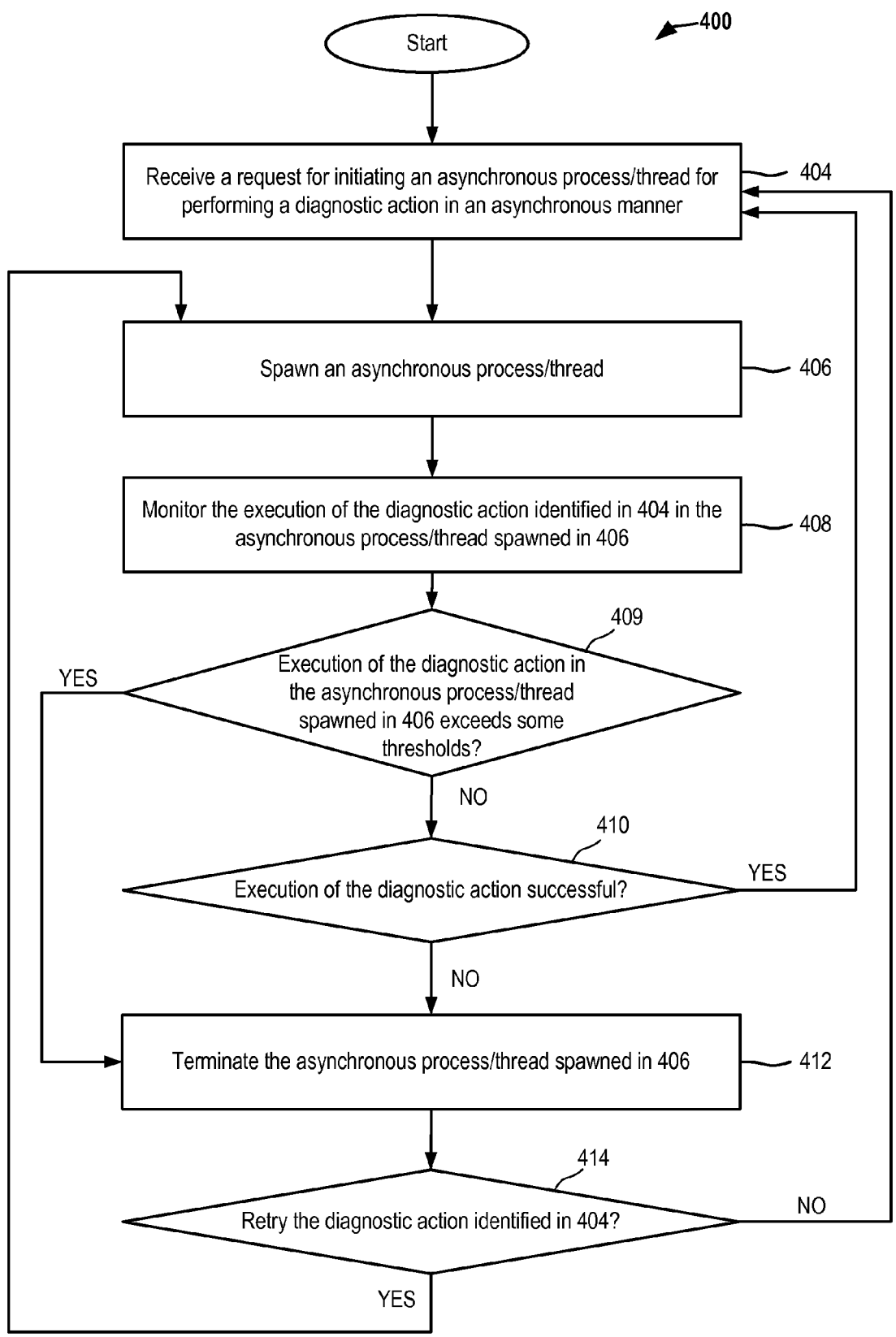
FIG. 4 is a simplified flow chart depicting a method for initiating an asynchronous process or thread for performing a diagnostic action in an asynchronous manner according to an embodiment of the present invention.

FIG. 4 is a simplified flow chart depicting a method for initiating an asynchronous process or thread for performing a diagnostic action in an asynchronous manner according to an embodiment of the present invention. In one embodiment, the processing depicted in FIG. 4 is performed by asynchronous process manager 112f depicted in FIG. 1 and FIG. 2.

Referring to FIG. 4, at 404, a request is received to spawn an asynchronous process or thread for performing a diagnostic action identified in the request asynchronously. The request received in 404 may include an action name, an action ID, and other information related to the diagnostic action. At 406, an asynchronous process or thread is initiated or spawned. At 408, the execution of the diagnostic action identified in 404 in the asynchronous process or thread spawned in 406 is monitored to prevent the asynchronous process or thread from adversely impacting the monitored system. As previously described, various different types of thresholds may be defined. For example, these thresholds may be related to the number of processes or threads executing in parallel in the monitored system, thresholds related to resources (e.g. time taken by the processes or threads, memory usage, CPU usage, etc.) used by the process or thread, and other thresholds.

Accordingly, in 409, a check is made to see if any threshold is reached or exceeded by the process or thread initiated in

406. No preventive action is performed upon determining in 409 that no thresholds have been reached or exceeded and processing proceeds to 410. Alternatively, if it is determined in 409 that one or more thresholds have been reached or exceeded, then at 412 preventive actions may be performed such as by terminating the process or thread spawned I 406. The monitoring may be performed on a periodic basis.

At 410, processing is performed to determine if the diagnostic action executed in the asynchronous process or thread spawned in 406 has successfully completed. For example, the asynchronous process or thread spawned in 406 that executes the diagnostic action may return a status upon the end of the execution to indicate if execution of the diagnostic action was completed successfully, incomplete, or failed, etc. If it is determined in 410 that execution of the diagnostic action has not successfully completed, at 414, processing is performed to determine if the diagnostic action identified in 404 is to be retried.

If it is determined that the diagnostic action identified in 404 is to be retried, then processing returns to 406 to initiate another process or thread for executing the diagnostic action again. The diagnostic action may be restarted by the newly initiated process or thread in 406. Alternatively, the newly initiated process or thread in 406 may pick up processing of the diagnostic action from where it was left off on the previous attempt based upon state information stored during the previous attempt. If the diagnostic action identified in 404 is not to be retried as determined in 414, then no further processing is performed for the diagnostic action and processing returns to 404.

Figure 5:
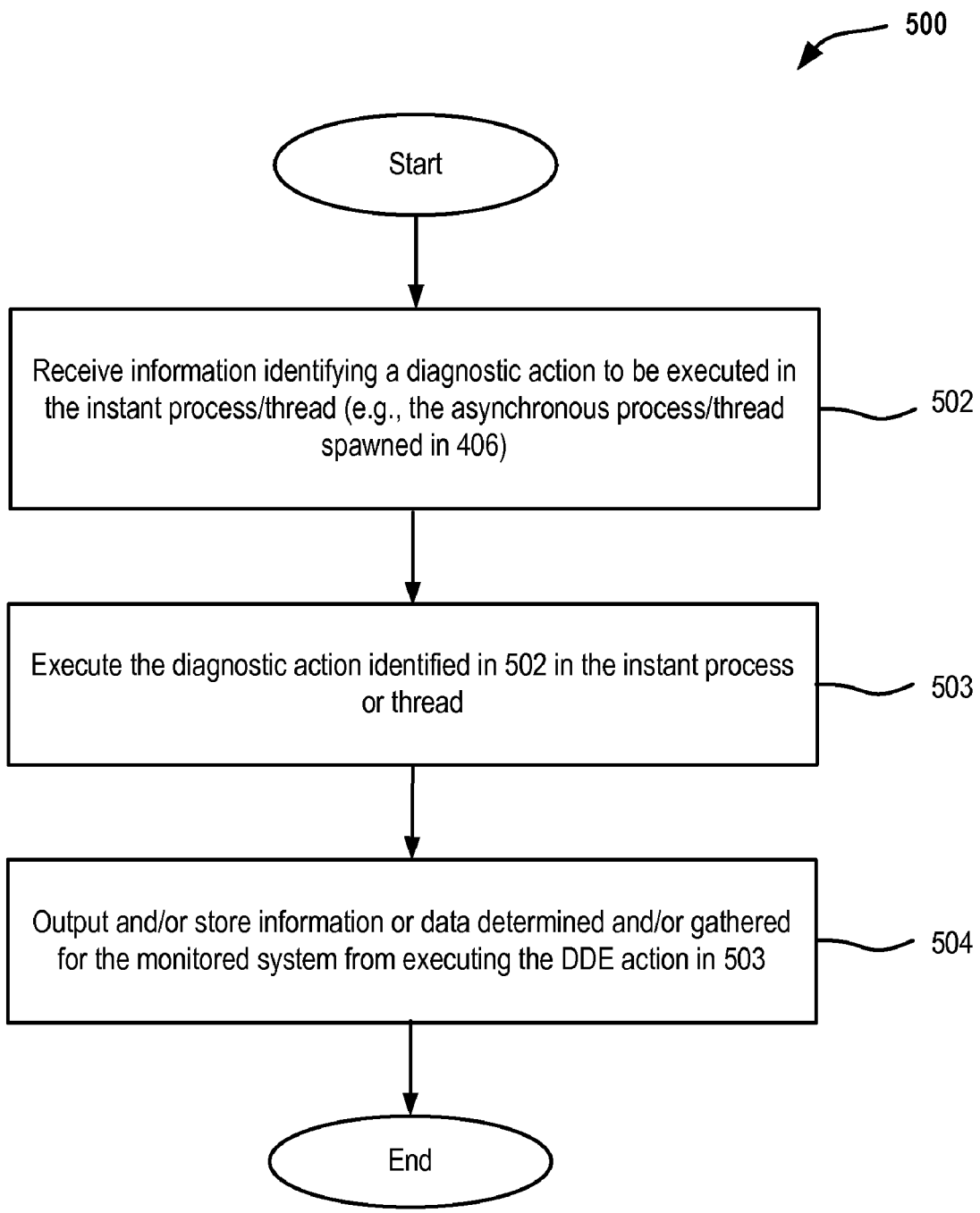
FIG. 5 is a simplified flow chart depicting a method for performing a diagnostic action in an asynchronous process or thread according to an embodiment of the present invention.

FIG. 5 is a simplified flow chart depicting a method for performing a diagnostic action in an asynchronous process or thread according to an embodiment of the present invention.

Referring to FIG. 5, at 502, information is received identifying a diagnostic action to be executed in the instant process or thread. For example, the instant process or thread may be a process or thread that is different from the failing process or thread, such as the asynchronous process or thread that was spawned in 406. The information received in 502 may include an action name, an action ID, and other information related to the diagnostic action. At 503, the diagnostic action identified in 502 is executed in the instant process or thread.

At 504, the results from executing the diagnostic action in 503 may be output and/or stored. The results from executing the diagnostic action in 503 may include information related to monitored system 110 that is determined and/or gathered for diagnostic purposes, such as relevant diagnostic data gathered for a condition detected in system 110. In one embodiment, the results from executing the diagnostic action in 503 may be displayed to a user via a display device (optional) such as via a user interface displayed on a monitor. The results from executing the diagnostic action in 503 may be stored in diagnostic data repository 112b.

Figure 6:
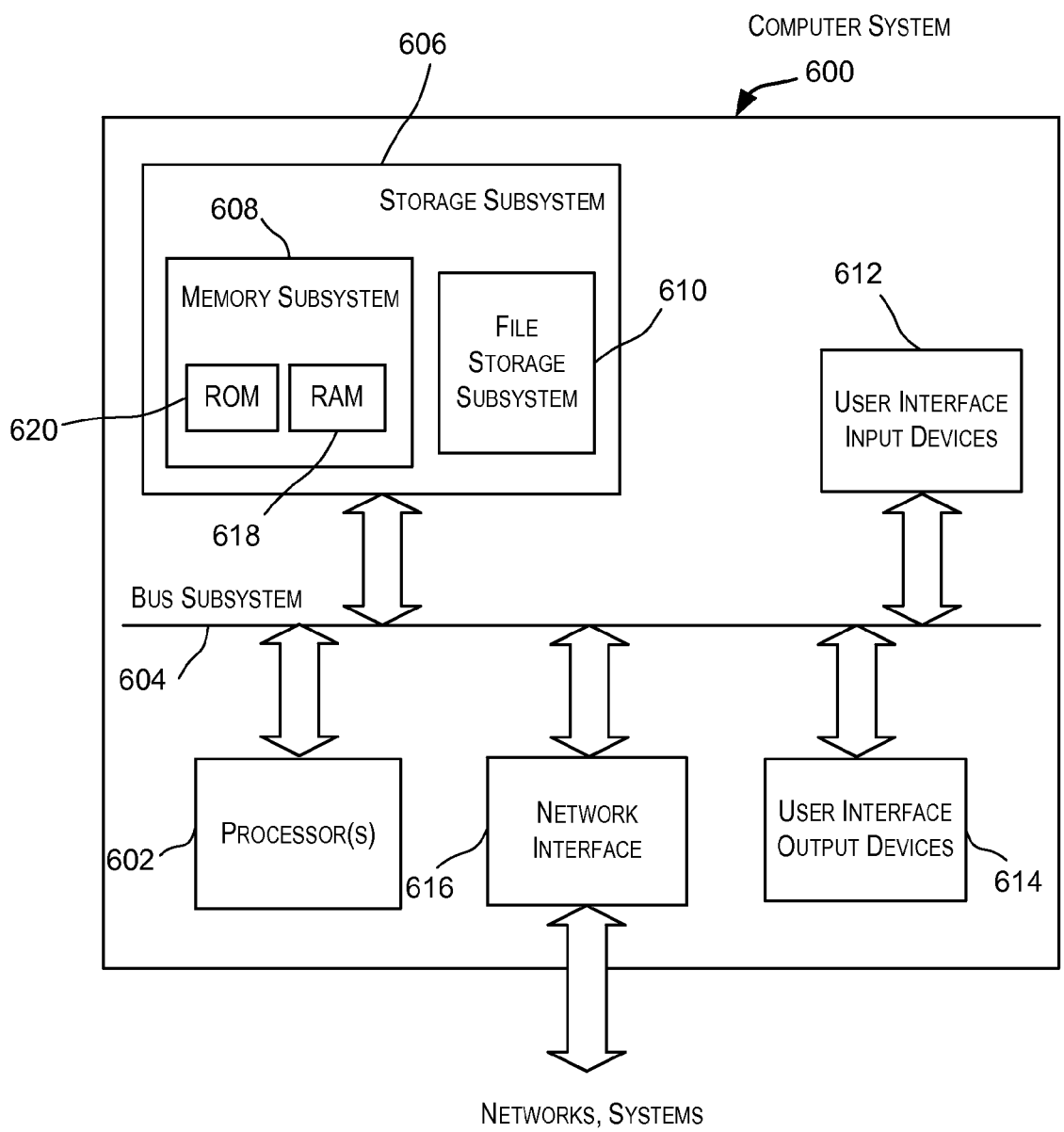
FIG. 6 is a simplified block diagram of a computer system that may be used to practice an embodiment of the various inventions described in this application.

FIG. 6 is a simplified block diagram of a computer system 600 that may be used to practice an embodiment of the various inventions described in this application. Computer system 600 may serve as the platform for the diagnosability frameworks depicted in FIG. 1. For example, a computer system 600 at the monitored system site may serve as a platform for diagnosability framework 112. A computer system 600 located at a diagnosis site may serve as a platform for diagnosability framework 116. A diagnosability framework may also be distributed across multiple computer systems.

As shown in FIG. 6, computer system 600 includes a processor 602 that communicates with a number of peripheral subsystems via a bus subsystem 604. These peripheral subsystems may include a storage subsystem 606, comprising a memory subsystem 608 and a file storage subsystem 610, user interface input devices 612, user interface output devices 614, and a network interface subsystem 616.

Bus subsystem 604 provides a mechanism for letting the various components and subsystems of computer system 600 communicate with each other as intended. Although bus subsystem 604 is shown schematically as a single bus, alternative embodiments of the bus subsystem may utilize multiple busses.

Network interface subsystem 616 provides an interface to other computer systems, networks, and portals. Network interface subsystem 616 serves as an interface for receiving data from and transmitting data to other systems from computer system 600. For example, for the diagnosability framework deployed at the customer site or site where the software system is deployed, network interface subsystem 616 may be configured to transfer diagnostic packages from the customer site to the vendor or diagnosis site.

User interface input devices 612 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 600.

User interface output devices 614 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 600.

Storage subsystem 606 provides a computer-readable medium for storing the basic programming and data constructs that provide the functionality of the present invention. Software (code modules or instructions) that provides the functionality of the present invention may be stored in storage subsystem 606. These software modules or instructions may be executed by processor(s) 602. Storage subsystem 606 may also provide a repository for storing data used in accordance with the present invention such as the diagnostic data repository. Storage subsystem 606 may comprise memory subsystem 608 and file/disk storage subsystem 610.

Memory subsystem 608 may include a number of memories including a main random access memory (RAM) 618 for storage of instructions and data during program execution and a read only memory (ROM) 620 in which fixed instructions are stored. File storage subsystem 610 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 600 can be of various types including a personal computer, a portable computer, a workstation, a network computer, a mainframe, a kiosk, a server or any other data processing system. Due to the ever-changing nature of computers and networks, the description of computer system 600 depicted in FIG. 6 is intended only as a specific example for purposes of illustrating the preferred embodiment of the computer system. Many other configurations having more or fewer components than the system depicted in FIG. 6 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps. While the embodiments of the diagnosability framework have been described as providing diagnostic support for software product instances, in alternative embodiments, embodiments of the present invention may be used for providing diagnostic support for software products, hardware products, or products having combination of software and hardware.

Further, while the present invention has been described using a particular combination of hardware and software, it should be recognized that other combinations of hardware and software are also within the scope of the present invention. The present invention may be implemented using hardware, software, or combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the inventions.

What is claimed is:

1. A method for performing a diagnostic action in a monitored system, comprising:
   receiving indication of a condition from a first process or thread in the monitored system;
   determining a diagnostic action to be performed responsive to the condition, the diagnostic action comprising gathering diagnostic data for the condition;
   initiating a second process or thread; and
   executing the determined diagnostic action in the second process or thread, wherein the first process or thread can continue processing without being delayed or interrupted by the execution of the diagnostic action in the second process or thread.

2. The method of claim 1 wherein determining the diagnostic action comprises determining context data for the condition.

3. The method of claim 2 wherein executing the determined diagnostic action in the second process or thread comprises executing the diagnostic action using the context data determined for the condition.

4. The method of claim 1 further comprising monitoring the second process or thread to determine if the second process or thread causes one or more thresholds configured for the monitored system to be reached or exceeded.

5. The method of 4 wherein at least one threshold from the one or more thresholds is related to one or more resources used by the second process or thread.

6. The method of 5 wherein the at least one threshold is related to an amount of time taken by the second process or thread, an amount of central processing unit (CPU) usage by the second process or thread, an amount of resources used by the second process, or a number of processes or threads executing in the monitored system.

7. The method of claim 5 further comprising:
   determining that at least one threshold from the one or more thresholds is reached or exceeded due to the second process or thread; and
   performing a prevention action based upon determining that at least one threshold from the one or more thresholds is reached or exceeded due to the second process or thread.

8. The method of claim 7 wherein performing the preventive action comprises terminating the second process or thread.

9. The method of claim 1 further comprising initiating a third process or thread to perform a diagnostic action, wherein the second and the third process or threads are executed in parallel.

10. The method of claim 1 further comprising terminating the second process or thread upon determining unsuccessful completion of the diagnostic action performed by the second process or thread.

11. The method of claim 10 further comprising initiating a third process or thread to execute the diagnostic action that was determined to be unsuccessfully completed in the second process or thread.

12. A computer readable storage medium storing a plurality of instructions for controlling a processor to perform a diagnostic action in a monitored system, the plurality of instructions comprising:
   instructions that cause the processor to receive indication of a condition from a first process or thread in the monitored system;
   instructions that cause the processor to determine a diagnostic action to be performed responsive to the condition, the diagnostic action comprising gathering diagnostic data for the condition;
   instructions that cause the processor to initiate a second process or thread; and
   instructions that cause the processor to execute the determined diagnostic action in the second process or thread, wherein the first process or thread can continue processing without being delayed or interrupted by the execution of the diagnostic action in the second process or thread.

13. The computer readable storage medium of claim 12 wherein the plurality of instructions further comprises instructions that cause the processor to monitor the second process or thread to determine if the second process or thread causes one or more thresholds configured for the monitored system to be reached or exceeded.

14. The computer readable storage medium of claim 12 wherein at least one threshold from the one or more thresholds is related to an amount of time taken by the second process or thread, an amount of central processing unit (CPU) usage by the second process or thread, an amount of resources used by the second process, or a number of processes or threads executing in the monitored system.

15. The computer readable storage medium of claim 14 wherein the plurality of instructions further comprises:
   instructions that cause the processor to determine that at least one threshold from the one or more thresholds is reached or exceeded due to the second process or thread; and
   instructions that cause the processor to perform a prevention action based upon determining that at least one threshold from the one or more thresholds is reached or exceeded due to the second process or thread.

16. The computer readable storage medium of claim 15 wherein the instructions that cause the processor to perform the prevention action comprise instructions that cause the processor to terminate the second process or thread.

17. The computer readable storage medium of claim 12 wherein the plurality of instructions further comprises instructions that cause the processor to initiate a third process or thread to perform a second diagnostic action, wherein the second and the third process or threads are executed in parallel.

18. The computer readable storage medium of claim 12 wherein the plurality of instructions further comprises instructions that cause the processor to terminate the second process or thread upon determining unsuccessful completion of the diagnostic action performed by the second process or thread.

19. The computer readable storage medium of claim 18 wherein the plurality of instructions further comprises instructions that cause the processor to initiate a third process or thread to execute the diagnostic action that was determined to be unsuccessfully completed in the second process or thread.

20. A system for performing a diagnostic action for a monitored system, the system comprising:
a memory; and
a processor coupled to the memory;
wherein the processor is configured to:
   receive indication of a condition from a first process or thread in the monitored system;
   determine a diagnostic action to be performed responsive to the condition, the diagnostic action comprising gathering diagnostic data for the condition;
   initiate a second process or thread; and
   execute the determined diagnostic action in the second process or thread, wherein the first process or thread can continue processing without being delayed or interrupted by the execution of the diagnostic action in the second process or thread.

* * * * *

UNITED STATES PATENT AND TRADEMARK OFFICE
CERTIFICATE OF CORRECTION

| | | |
|---|---|---|
| PATENT NO. | : 8,135,988 B2 | Page 1 of 1 |
| APPLICATION NO. | : 12/251711 | |
| DATED | : March 13, 2012 | |
| INVENTOR(S) | : Ramacher et al. | |

It is certified that error appears in the above-identified patent and that said Letters Patent is hereby corrected as shown below:

On page 2, in column 2, under "Other Publications", line 13, delete "IEEE. ." and insert -- IEEE. --, therefor.

On page 3, in column 1, under "Other Publications", line 28, delete "B.V. Zhang," and insert -- Zhang, --, therefor.

In column 4, line 49, delete "12a," and insert -- 112a, --, therefor.

In column 12, line 61, delete "Corruption)" and insert -- Corruption). --, therefor.

In column 17, line 6, delete "I" and insert -- in --, therefor.

In column 19, line 55, in Claim 5, delete "4" and insert -- claim 4 --, therefor.

In column 19, line 58, in Claim 6, delete "5" and insert -- claim 5 --, therefor.

Signed and Sealed this
Fifth Day of June, 2012

David J. Kappos
*Director of the United States Patent and Trademark Office*